(12) United States Patent
Yao et al.

(10) Patent No.: US 11,519,557 B2
(45) Date of Patent: Dec. 6, 2022

(54) METHOD FOR MANUFACTURING FILLED CONTAINER, AND FILLED CONTAINER

(71) Applicant: Central Glass Company, Limited, Ube (JP)

(72) Inventors: Akifumi Yao, Ube (JP); Masakiyo Nagatomo, Ube (JP); Shinya Ikeda, Ube (JP)

(73) Assignee: Central Glass Company, Limited, Ube (JP)

( * ) Notice: Subject to any disclaimer, the term of this patent is extended or adjusted under 35 U.S.C. 154(b) by 531 days.

(21) Appl. No.: 16/625,963

(22) PCT Filed: Jul. 24, 2018

(86) PCT No.: PCT/JP2018/027662
§ 371 (c)(1),
(2) Date: Dec. 23, 2019

(87) PCT Pub. No.: WO2019/026682
PCT Pub. Date: Feb. 7, 2019

(65) Prior Publication Data
US 2020/0173009 A1    Jun. 4, 2020

(30) Foreign Application Priority Data

Aug. 1, 2017 (JP) .............................. JP2017-148961

(51) Int. Cl.
| | |
|---|---|
| *F17C 13/00* | (2006.01) |
| *F17C 1/10* | (2006.01) |
| *C23C 8/08* | (2006.01) |
| *C23F 11/00* | (2006.01) |

(52) U.S. Cl.
CPC ................ *F17C 13/00* (2013.01); *C23C 8/08* (2013.01); *F17C 1/10* (2013.01); *C23F 11/00* (2013.01); *F17C 2203/0639* (2013.01); *F17C 2221/03* (2013.01)

(58) Field of Classification Search
CPC ..... C23C 8/38; C23C 8/08; F17C 1/10; F17C 13/00; F17C 2203/0639; F17C 2221/03; F17C 3/12; C21D 1/68; C21D 1/70; C21D 1/72
See application file for complete search history.

(56) References Cited

U.S. PATENT DOCUMENTS

| | | |
|---|---|---|
| 6,699,603 B1 | 3/2004 | Ohmi et al. |
| 2004/0026417 A1 | 2/2004 | Kikkawa et al. |
| 2005/0279130 A1 | 12/2005 | Bjork |
| 2013/0032600 A1 | 2/2013 | Umezaki et al. |
| 2014/0203210 A1 | 7/2014 | Carey et al. |
| 2016/0123534 A1 | 5/2016 | Tsuzaki et al. |
| 2018/0015589 A1 | 1/2018 | Kohinata |
| 2018/0245221 A1 | 8/2018 | Kohinata et al. |
| 2019/0113176 A1 | 4/2019 | Takizawa et al. |
| 2019/0330749 A1 | 10/2019 | Kohinata et al. |

FOREIGN PATENT DOCUMENTS

| | | |
|---|---|---|
| CN | 1310305 A | 8/2001 |
| CN | 102517540 A | 6/2012 |
| CN | 102884348 A | 1/2013 |
| CN | 105358511 A | 2/2016 |
| EP | 1 186 353 A2 | 3/2002 |
| JP | 2-175855 A | 7/1990 |
| JP | 3-215656 A | 9/1991 |
| JP | 2006-3362 A | 1/2006 |
| JP | 2009-197274 A | 9/2009 |
| TW | 476805 B | 2/2002 |
| TW | 503123 B | 9/2002 |
| WO | WO 00/34546 A1 | 6/2000 |
| WO | WO 2016/117464 A1 | 7/2016 |
| WO | WO 2017/047470 A1 | 3/2017 |
| WO | WO 2017/175562 A1 | 10/2017 |

OTHER PUBLICATIONS

English translation of document B4 (JP 3-215656 A previously filed on Dec. 23, 2019) (nine pages).
English translation of document B5 (JP 2-175855 A previously filed on Dec. 23, 2019) (12 pages).
English translation of document B1 (JP 2009-197274 A previously filed on Dec. 23, 2019) (24 pages).
International Search Report (PCT/ISA/210) issued in PCT Application No. PCT/JP2018/027662 dated Sep. 18, 2018 with English translation (four (4) pages).
Japanese-language Written Opinion (PCT/ISA/237) issued in PCT Application No. PCT/JP2018/027662 dated Sep. 18, 2018 (three (3) pages).

*Primary Examiner* — James N Smalley
*Assistant Examiner* — Jennifer Castriotta
(74) *Attorney, Agent, or Firm* — Crowell & Moring LLP

(57) ABSTRACT

The method for producing a filled container of the present invention includes: providing a metal storage container, at least an inner surface of which is formed of a manganese steel and in which the inner surface has a surface roughness $R_{max}$ of 10 μm or less; performing fluorination by bringing the inner surface of the storage container into contact with a gas containing at least one first fluorine-containing gas selected from the group consisting of $ClF_3$, $IF_7$, $BrF_5$, $F_2$, and $WF_6$ at 50° C. or lower; purging the inside of the storage container with an inert gas; and filling the inside of the storage container with at least one second fluorine-containing gas selected from the group consisting of $ClF_3$, $IF_7$, $BrF_5$, $F_2$, and $WF_6$.

15 Claims, No Drawings

METHOD FOR MANUFACTURING FILLED CONTAINER, AND FILLED CONTAINER

TECHNICAL FIELD

The present invention relates to a method for producing a filled container by filling a metal storage container with a fluorine-containing gas such as $ClF_3$ or $IF_7$, and the filled container.

BACKGROUND ART

Storage containers used for filling with a fluorine-containing gas such as $ClF_3$ or $IF_7$ include stainless steel containers.

Fluorine-containing gases, however, are highly corrosive. When a fluorine-containing gas is brought into contact with the stainless steel, it reacts with the stainless steel surface, causing corrosion of the storage container. Such contact also causes, for example, formation of ClF from $ClF_3$, or $IF_5$ from $IF_7$, as a by-product, reducing the purity of the fluorine-containing gas. The reaction of the fluorine-containing gas with the stainless steel further causes metal fluoride, metal oxyfluoride, and the like to enter the fluorine-containing gas, resulting in a large amount of metallic impurities.

To reduce the reaction of the metal storage containers with fluorine-containing gases, fluoride films have been formed on the surface of the metal materials. For example, Patent Literature 1 discloses forming a fluoride film on a surface of a metal material by exposing a metal material such as a stainless steel to $ClF_3$ at 80° C. or lower. The fluoride film is formed to prevent a decrease in $ClF_3$ content by reducing the adsorption of $ClF_3$ gas on the metal and the reaction of $ClF_3$ gas on the metal surface. In Examples of Patent Literature 1, a metal container made of a stainless steel or the like was filled with $ClF_3$ gas having a concentration of 100%, and held at 80° C. for 18 hours. The inner surface of the metal container was thus exposed to $ClF_3$ to form a fluoride film.

Patent Literature 2 discloses forming a fluoride film with good corrosion resistance, wherein the fluoride film has a thickness of 190 Å or less to reduce metal deposits formed during welding. In Examples of Patent Literature 2, a stainless steel was heated to 150° C. and exposed to 1% diluted $F_2$ gas to form a fluoride film.

Patent Literature 3 (published after the priority date of the present application) discloses forming a fluoride passive film by contact with a ClF-containing gas to reduce the fluorination reaction and adsorption of ClF filling the storage container. In Examples of Patent Literature 3, a passive film having a thickness of 4 nm was formed by treatment using ClF gas at 10° C. to 100° C., and a passive film having a thickness of 8 nm was formed by treatment using $F_2$ gas at 10° C. to 100° C.

In semiconductor device production, the technical difficulty of processing is increasing year after year with the development of miniaturization and high integration techniques. In such a situation, impurities contained in the materials of the semiconductor devices may cause problems such as a reduction in yield in the process of semiconductor device production. Thus, the fluorine-containing gases used in the process of semiconductor device production are also required to have higher purity. In particular, it is required to reduce the concentration of metallic impurities, which greatly affect the electrical characteristics of semiconductor devices, to less than 10 ppb by mass in the gas.

CITATION LIST

Patent Literature

Patent Literature 1: JP 2009-197274 A (JP 5317321 B)
Patent Literature 2: WO 2000/034546 (JP 4319356 B)
Patent Literature 3: WO 2017/175562

SUMMARY OF INVENTION

Technical Problem

Forming a fluoride film on the surface of the metal material as in Patent Literatures 1 to 3 can reduce the reaction of a fluorine-containing gas with the surface of the metal material. Forming such a film thus can have the effect of reducing the corrosion of the metal material and the decrease in purity of the fluorine-containing gas, as well as the effect of reducing the formation of metallic impurities due to the reaction of the fluorine-containing gas with the metal material. However, it has been impossible to reduce the concentration of metallic impurities to less than 10 ppb by mass, because trace metallic impurities enter the fluorine-containing gas.

For example, when a stainless steel container with a fluoride film formed thereon is filled with $ClF_3$ gas, metals such as Cr and Fe contained in the stainless steel enter the $ClF_3$ gas as metallic impurities, increasing the concentration of metallic impurities in the $ClF_3$ gas with time.

The present invention was made to solve the above problems, and aims to provide a method for producing a filled container that can not only reduce a decrease in purity of a fluorine-containing gas but also can prevent a metallic impurity derived from a metal material from entering the fluorine-containing gas. The present invention also aims to provide the filled container.

Solution to Problem

The present inventors made various studies to achieve the above aim. The inventors considered that the entry of trace metallic impurities into the fluorine-containing gas is caused not only by the formation of an oxyfluoride containing a metal element by the reaction of the fluorine-containing gas with the terminals of the metal surface (usually terminated with hydrogen, oxygen, a hydroxy group, or the like if no fluorination treatment is performed) or with moisture adhered to the metal surface, but also by the fluoride film formed on the surface of the metal material as it separates from the surface due to shock, moisture, or the like and enters the fluorine-containing gas as metal particles. The inventors found out that fluorination treatment to the extent that the surface of the metal material is terminated with fluorine atoms, instead of the formation of a fluoride film on the surface, can both reduce the decomposition of the fluorine-containing gas and prevent the entry of a metallic impurity into the fluorine-containing gas.

The method for producing a filled container of the present invention includes: providing a metal storage container, at least an inner surface of which is formed of a manganese steel and in which the inner surface has a surface roughness $R_{max}$ of 10 μm or less; performing fluorination by bringing the inner surface of the storage container into contact with a gas containing at least one first fluorine-containing gas selected from the group consisting of $ClF_3$, $IF_7$, $BrF_5$, $F_2$, and $WF_6$ at 50° C. or lower; purging the inside of the storage container with an inert gas; and filling the inside of the storage container with at least one second fluorine-containing gas selected from the group consisting of $ClF_3$, $IF_7$, $BrF_5$, $F_2$, and $WF_6$.

The filled container of the present invention includes: a metal storage container; and at least one fluorine-containing gas selected from the group consisting of $ClF_3$, $IF_7$, $BrF_5$, $F_2$, and $WF_6$, filling the storage container, wherein at least an inner surface of the storage container is formed of a manganese steel, the inner surface has a surface roughness $R_{max}$ of 10 μm or less, and a surface that contacts the fluorine-containing gas inside the storage container has a mole ratio F/Fe of a fluorine atom F to an iron atom Fe of 0.01 or more and less than 3 and a mole ratio O/Fe of an oxygen atom O to the iron atom Fe of 1 or less, each on average within 10 nm from an outermost surface.

Advantageous Effects of Invention

The present invention can reduce a decrease in purity of a fluorine-containing gas and also can prevent a metallic impurity derived from a metal material from entering the fluorine-containing gas.

DESCRIPTION OF EMBODIMENTS

The present invention is described in detail below. The description of constitutional elements below is one exemplary embodiment of the present invention. The present invention should not be limited to the specific content of the description. Various modifications can be made within the gist of the present invention.

[Method for Producing Filled Container]

The method for producing a filled container of the present invention includes: providing a metal storage container; performing fluorination by bringing the inner surface of the storage container into contact with a gas containing a first fluorine-containing gas at 50° C. or lower; purging the inside of the storage container with an inert gas; and filling the inside of the storage container with a second fluorine-containing gas.

In the method for producing a filled container of the present invention, at least an inner surface of the storage container is formed of a manganese steel.

Among metal elements, chromium easily enters the fluorine-containing gas. Use of a manganese steel, which contains less chromium than a stainless steel, can prevent a metallic impurity derived from the metal material of the inner surface of the storage container from entering the fluorine-containing gas that fills the storage container.

The manganese steel preferably contains 97% by mass or more iron and 1% by mass or more and 2% by mass or less manganese. Even when the manganese steel inevitably contains nickel or chromium, preferably, the nickel content is 0.25% by mass or less and the chromium content is 0.35% by mass or less. Examples of the manganese steel include SMn420, SMn433, SMn438, and SMn443 specified in JIS G 4053:2016 and STH11 and STH12 specified in JIS G 3429:2013.

In the method for producing a filled container of the present invention, the inner surface of the storage container has a surface roughness $R_{max}$ of 10 μm or less. The surface roughness $R_{max}$ of the inner surface is preferably 5 μm or less, more preferably 1 μm or less. In many cases, the surface roughness $R_{max}$ of the inner surface is 0.1 μm or more.

The surface roughness $R_{max}$ as used herein refers to the maximum height specified in JIS B 0601:1982. The surface roughness $R_{max}$ means the height difference between the highest peak and the deepest valley in the roughness profile within the range of the sampling length of the primary profile. The roughness profile is obtained by removing the surface waviness from the primary profile.

A high surface roughness (maximum height) leads to increased gas adsorption on the surface of the metal material. Thus, when the metal material has a high surface roughness, air components such as $O_2$ are adsorbed and remain on the surface of the metal material. They are released from the surface and enter the fluorine-containing gas coming into contact with the metal material, thereby reducing the purity of the fluorine-containing gas stored in the storage container. In addition, when the metal material has a high surface roughness, the moisture remaining on the surface of the metal material reacts with the fluorine-containing gas, causing formation of an impurity such as HF. Decreasing the surface roughness of the metal material thus can reduce the air components and moisture adsorbed on the surface, and thereby reduce a decrease in the purity of the fluorine-containing gas.

In the method for producing a filled container of the present invention, the surface roughness $R_{max}$ of the inner surface can be adjusted to 10 μm or less by, for example, polishing the inner surface of the storage container.

The inner surface of the storage container may be polished by any method that can polish the inner surface to a predetermined roughness. Examples of the method include buffing, electropolishing, and barrel polishing.

Buffing is a method of polishing a metal material with a fabric or paper abrasive cloth and optionally an abrasive. Electropolishing is a method of polishing a surface of a metal material by passing an electric current in an electrolyte solution.

Barrel polishing is a method of polishing the inner surface of a container, in which the container is charged with a polishing suspension containing an abrasive, a solvent, and an additive, tightly sealed, and then subjected to both rotation and revolution to bring the inner surface of the container into contact with the abrasive. The material of the abrasive may be, for example, diamond, zirconia, alumina, silica, silicon nitride, silicon carbide, silica-alumina, iron, a carbon steel, a chrome steel, or a stainless steel. The solvent used for the polishing is not limited, but water is usually used. Examples of the additive used for polishing include a pH adjuster, a surfactant, and a corrosion inhibitor.

After the polishing is completed, the abrasive and the like attached to the surface is removed with water or alcohol to clean the surface of the metal material. The surface is then dried.

In the method for producing a filled container of the present invention, fluorination treatment is performed by bringing the inner surface of the storage container into contact with a gas containing a first fluorine-containing gas at 50° C. or lower.

The fluorination treatment is performed at 50° C. or lower to terminate the surface of the metal material with a fluorine atom or an oxygen atom. This can reduce the formation of an impurity such as HF due to the reaction of a part terminated with a hydrogen atom or a hydroxy group with the fluorine-containing gas.

At a fluorination treatment temperature higher than 50° C., the fluorine-containing gas vigorously reacts with the surface of the metal material, which in many cases causes formation of a metal fluoride film. Moreover, at a fluorination treatment temperature higher than 50° C., an oxygen atom on the surface of the metal material is released as $OF_2$ or the like during the fluorination treatment and disadvantageously replaced with a fluorine atom.

In the method for producing a filled container of the present invention, the fluorination treatment is preferably performed at 40° C. or lower, more preferably 30° C. or lower. The lower limit of the fluorination treatment temperature is not limited, but the fluorination treatment is preferably performed at 0° C. or higher, more preferably 10° C. or higher.

The first fluorine-containing gas is at least one gas selected from the group consisting of $ClF_3$, $IF_7$, $BrF_5$, $F_2$, and $WF_6$. The first fluorine-containing gas used in the fluorination treatment may be the same as or different from the second fluorine-containing gas stored in the storage container. The first fluorine-containing gas is preferably $F_2$ gas. $F_2$ gas consists only of F, so that it does not produce a by-product such as ClF or $IF_5$. Use of $F_2$ gas as the first fluorine-containing thus can reduce a decrease in the purity of the fluorine-containing gas stored in the storage container.

The fluorination treatment may be performed at any pressure. For example, the pressure may be appropriately set within the range of 10 kPa to 1 MPa. The fluorination treatment may be performed under atmospheric pressure, for example.

The fluorination treatment may be performed for any length of time. For example, the time may be appropriately set within the range of 1 minute to 24 hours. The time needed for the fluorination treatment depends on factors such as the fluorination treatment temperature or pressure or the amount of the fluorine-containing gas used in the fluorination treatment. The end point of the fluorination treatment may be defined as the time point at which the pressure of the fluorine-containing gas used in the fluorination treatment no longer decreases. In the examples described later, the fluorination treatment was performed for a sufficient time, so that the fluorination treatment is considered to have been completed.

In the method for producing a filled container of the present invention, after the fluorination treatment, the inside of the storage container is purged with an inert gas.

The inert gas may be a rare gas such as argon gas or helium gas, or may be nitrogen gas, for example.

In the method for producing a filled container of the present invention, the inside of the storage container after the purging with an inert gas is filled with a second fluorine-containing gas.

The second fluorine-containing gas is at least one gas selected from the group consisting of $ClF_3$, $IF_7$, $BrF_5$, $F_2$, and $WF_6$. The second fluorine-containing gas is preferably at least one gas selected from the group consisting of $ClF_3$, $IF_7$, and $BrF_5$, which are interhalogen compounds. In particular, the second fluorine-containing gas is more preferably $ClF_3$ gas or $IF_7$ gas, each of which has high practicality.

The filled container is obtained by the above steps. The method for producing a filled container of the present invention can favorably produce the filled container described in [Filled container].

For example, the method for producing a filled container of the present invention can produce a filled container wherein a surface that contacts the fluorine-containing gas inside the storage container has a mole ratio F/Fe of a fluorine atom F to an iron atom Fe of 0.01 or more and less than 3 and a mole ratio O/Fe of an oxygen atom O to the iron atom Fe of 1 or less, each on average within 10 nm from an outermost surface. The mole ratio F/Fe is preferably 0.05 or more and less than 3, more preferably 0.1 or more and 2.5 or less, still more preferably 0.5 or more and 2 or less. The mole ratio O/Fe is preferably 0.8 or less.

[Filled Container]

The filled container of the present invention includes a metal storage container filled with a fluorine-containing gas.

In the filled container of the present invention, a surface that contacts the fluorine-containing gas inside the storage container has a mole ratio F/Fe of a fluorine atom F to an iron atom Fe of 0.01 or more and less than 3 and a mole ratio O/Fe of an oxygen atom O to the iron atom Fe of 1 or less, each on average within 10 nm from an outermost surface.

The mole ratios F/Fe and O/Fe each can be calculated based on an integrated intensity ratio obtained by X-ray photoelectron spectroscopy (XPS). XPS provides information on the very surface of the material, but with argon etching, XPS can provide information on the depth direction. Here, since the etching rate in argon etching varies according to the device or the treatment conditions, the correlation between the etching amount and the etching treatment time needs to be determined in advance using a reference sample or the like. The elements are then analyzed while performing etching at certain time intervals, whereby data concerning the element composition versus depth is obtained. From the results, the average within 10 nm from the surface can be calculated. For example, XPS involves irradiating the sample with soft X-rays such as Mg Kα rays (1253.6 eV) or Al Kα rays (1486.6 eV), and measuring the kinetic energy of photoelectrons emitted from the sample surface to provide information of the types, abundances, and chemical bonding states of the elements constituting the sample surface.

In the filled container of the present invention, the mole ratio F/Fe is 0.01 or more and less than 3, preferably 0.05 or more and less than 3, more preferably 0.1 or more and 2.5 or less, still more preferably 0.5 or more and 2 or less.

When fluorinated, the iron or manganese constituting the metal material forms iron(III) fluoride or manganese(III) fluoride. With a mole ratio F/Fe of less than 3, the surface of the metal material is neither iron(III) fluoride nor manganese (III) fluoride in the stoichiometric ratio, so that no fluoride film is formed. It is thus possible to reduce the separation of a fluoride from a fluoride film and the entry of the fluoride into the fluorine-containing gas as a metallic impurity.

With a mole ratio F/Fe of less than 0.01, less of the surface of the metal material is terminated with a fluorine atom. The non-terminated part (terminated with OH or H) of the metal thus reacts with the fluorine-containing gas, causing formation of an impurity such as HF.

With a mole ratio F/Fe of more than 3, a fluorine compound film is formed on the surface of the metal material. Separation or the like of this film forms a metallic impurity. In addition, the metal surface after the film separation reacts with the fluorine-containing gas, causing formation of a metallic impurity.

In the filled container of the present invention, the mole ratio O/Fe is 1 or less, preferably 0.8 or less. When the surface of the metal material has a high oxygen content, an oxygen-binding site reacts with the fluorine-containing gas, causing the formation of a metal oxyfluoride ($MO_xF_y$) that easily enters the fluorine-containing gas as a metallic impurity. In many cases, the mole ratio O/Fe is 0.01 or more because it is difficult to completely prevent the entry of oxygen.

In the filled container of the present invention, at least an inner surface of the storage container is formed of a manganese steel. The manganese steel preferably contains 97% by mass or more iron and 1% by mass or more and 2% by mass or less manganese.

Other details of the manganese steel are as described in [Method for Producing a Filled Container].

In the filled container of the present invention, the surface roughness $R_{max}$ of the inner surface of the storage container is 10 μm or less. The surface roughness $R_{max}$ of the inner surface is preferably 5 μm or less, more preferably 1 μm or less. The surface roughness $R_{max}$ of the inner surface is in many cases 0.1 μm or more.

As described in [Method for producing a filled container], a high surface roughness of the metal material causes air components and moisture to remain on the surface of the metal material, thus causing a decrease in the purity of the fluorine-containing gas stored in the storage container. In the filled container produced by [Method for producing a filled container], adsorption of a large amount of air components on the surface of the metal material disadvantageously results in a high mole ratio O/Fe of the surface of the metal material after the fluorination treatment.

In the filled container of the present invention, the fluorine-containing gas filling the storage container is at least one gas selected from the group consisting of $ClF_3$, $IF_7$, $BrF_5$, $F_2$, and $WF_6$. The fluorine-containing gas is preferably at least one selected from the group consisting of $ClF_3$, $IF_7$, and $BrF_5$, which are interhalogen compounds. In particular, the fluorine-containing gas is more preferably $ClF_3$ gas or $IF_7$ gas, each of which has high practicality.

As described above, the filled container of the present invention can prevent a metallic impurity derived from the metal material of the inner surface of the storage container from entering the fluorine-containing gas stored in the storage container.

The filling amount and pressure of the fluorine-containing gas stored in the storage container vary according to the type of the gas. For example, the boiling point (1 atmospheric pressure) and the vapor pressure (35° C., gauge pressure) of $ClF_3$ are about 12° C. and 0.14 MPa, those of $IF_7$ are about 5° C. and 0.17 MPa, and those of $BrF_5$ are about 40° C. and −0.02 MPa. Since filling at a pressure equal to or higher than the vapor pressure liquefies the gases in the storage container, the filling amount in the storage container is preferably controlled by weight. Meanwhile, unlike $ClF_3$, $IF_7$, and $BrF_5$, $F_2$ does not liquefy in a usually used pressure range or temperature range. The filling amount of $F_2$ thus depends on pressure.

In the filled container of the present invention, the amount of a metal element contained in a metallic impurity in the fluorine-containing gas taken out from the filled container is preferably less than 10 ppb by mass, more preferably less than 5 ppb by mass. In particular, it is preferred that the amount of each of the Fe, Mn, Cr, and Ni in the fluorine-containing gas is less than 10 ppb by mass, more preferably less than 5 ppb by mass.

The amount of the metal element contained in the metallic impurity can be determined by inductively coupled plasma mass spectrometry (ICP-MS).

In the filled container of the present invention, the fluorine-containing gas taken out from the filled container preferably has a purity of 99.9% by volume or more, more preferably more than 99.9% by volume.

The purity of the fluorine-containing gas can be determined by analyzing an impurity such as HF or $O_2$ in the fluorine-containing gas by Fourier transform infrared spectroscopy (FT-IR) and gas chromatography-mass spectrometry (GC-MS).

EXAMPLES

Examples specifically disclosing the present invention are shown below. The present invention should not be limited only to these examples.

Example 1

The inner surface of a 3.4-L cylinder formed of a manganese steel (symbol STH12, Mn: 1.35 to 1.70% by mass, C: 0.30 to 0.41% by mass, also containing Si, P, and S) was electropolished. A test piece (a 20 mm x 20 mm metal piece cut out of the container) was treated under the same polishing conditions. The surface roughness of the polished inner surface was evaluated by analyzing the test piece using a contact-type surface roughness tester and an atomic force microscope (AFM). The surface roughness $R_{max}$ was 1 μm or less.

The inner surface was then subjected to fluorination treatment by filling the cylinder with undiluted $F_2$ gas as a first fluorine-containing for 24 hours at 40° C. at atmospheric pressure, followed by purging with helium gas.

The above test piece was treated with the same conditions. The composition of the inner surface of the cylinder was evaluated with the test piece using an X-ray photoelectron spectrometer. The F/Fe was 1.94 and the O/Fe was 0.65.

The cylinder was filled with 2 kg of $IF_7$ gas as a second fluorine-containing gas at 0.17 MPa (gauge pressure, 35° C.) The $IF_7$ gas had a metallic impurity (Fe, Mn, Cr, and Ni) concentration of less than 5 ppb by mass and a purity of more than 99.9% by volume. The cylinder was stored for one month at room temperature (20° C. to 25° C.). After the storage, part of the $IF_7$ gas was taken out, and the metallic impurity concentration, HF concentration, and gas purity were measured. The amount of each of the Fe, Mn, Cr, and Ni contained in the metallic impurities was less than 5 ppb by mass, and the gas purity was more than 99.9% by volume, remaining unchanged from before the storage. The HF concentration was less than 100 ppm by volume.

Example 2

The same procedure as in Example 1 was performed except that the second fluorine-containing gas was changed to $WF_6$ gas. The amount of each of the Fe, Mn, Cr, and Ni in the $WF_6$ gas after the storage was less than 5 ppb by mass, and the gas purity was more than 99.9% by volume, remaining unchanged from before the storage. The HF concentration was less than 100 ppm by volume.

Example 3

The same procedure as in Example 1 was performed except that the second fluorine-containing gas was changed to $ClF_3$ gas. The amount of each of the Fe, Mn, Cr, and Ni in the $ClF_3$ gas after the storage was less than 5 ppb by mass, and the gas purity was more than 99.9% by volume, remaining unchanged from before the storage. The HF concentration was less than 100 ppm by volume.

Example 4

The same procedure as in Example 1 was performed except that the second fluorine-containing gas was changed to $F_2$ gas. The cylinder wad filled with the $F_2$ gas at 0.5 MPa (gauge pressure, 35° C.). The amount of each of the Fe, Mn, Cr, and Ni in the $F_2$ gas after the storage was less than 5 ppb by mass, and the gas purity was more than 99.9% by volume, remaining unchanged from before the storage. The HF concentration was less than 100 ppm by volume.

Example 5

The same procedure as in Example 1 was performed except that the condition for the fluorination treatment by filling with $F_2$ gas was changed to room temperature (20° C. to 25° C.) The composition of the inner surface of the cylinder was determined by XPS analysis of a test piece treated under the same conditions. The F/Fe was 0.82 and the O/Fe was 0.33. The amount of each of the Fe, Mn, Cr, and Ni in the $IF_7$ gas after the storage was less than 5 ppb by mass, and the gas purity was more than 99.9% by volume, remaining unchanged from before the storage. The HF concentration was less than 100 ppm by volume.

Example 6

The same procedure as in Example 1 was performed except that the first fluorine-containing gas and the second fluorine-containing gas were changed to $ClF_3$ gas having a metallic impurity (Fe, Mn, Cr, and Ni) concentration of less than 5 ppb by mass and a purity of more than 99.9% by volume, and that the cylinder was filled with 2 kg of the $ClF_3$ gas at 0.14 MPa (gauge pressure, 35° C.). The composition of the inner surface of the cylinder was determined by XPS analysis of a test piece treated under the same conditions. The F/Fe was 1.56 and the O/Fe was 0.48. The amount of each of the Fe, Mn, Cr, and Ni in the $ClF_3$ gas after the storage was less than 5 ppb by mass, and the gas purity was more than 99.9% by volume, remaining unchanged from before the storage. The HF concentration was less than 100 ppm by volume.

Example 7

The same procedure as in Example 1 was performed except that the first fluorine-containing gas was changed to $IF_7$ gas. The amount of each of the Fe, Mn, Cr, and Ni in the $IF_7$ gas after the storage was less than 5 ppb by mass, and the gas purity was more than 99.9% by volume, remaining unchanged from before the storage. The HF concentration was less than 100 ppm by volume.

Example 8

The same procedure as in Example 1 was performed except that the electropolishing conditions were changed to change the surface roughness $R_{max}$ of the inner surface of the cylinder to 4 μm. The composition of the inner surface of the cylinder was determined by XPS analysis of a test piece treated under the same conditions. The F/Fe was 1.15 and the O/Fe was 0.62. The amount of each of the Fe, Mn, Cr, and Ni in the $IF_7$ gas after storage was less than 5 ppb by mass, and the gas purity was more than 99.9% by volume, remaining unchanged from before the storage. The HF concentration was less than 100 ppm by volume.

Comparative Example 1

The same procedure as in Example 1 was performed except that the electropolishing conditions were changed to change the surface roughness $R_{max}$ of the inner surface of the cylinder to 12 μm, and that the fluorination treatment using $F_2$ gas was not performed. The composition of the inner surface of the cylinder was determined. The F/Fe was 0 and the O/Fe was 2.25. The amount of Fe in the $IF_7$ gas after the storage was 20 ppb by mass, which was more than 10 ppb by mass. The gas purity was less than 99.9% by volume. The HF concentration was more than 100 ppm by volume.

Comparative Example 2

The same procedure as in Example 1 was performed except that the fluorination treatment using $F_2$ gas was not performed. The amount of Fe in the $IF_7$ gas after the storage was 18 ppb by mass, which was more than 10 ppb by mass. The gas purity was less than 99.9% by volume. The HF concentration was more than 100 ppm by volume.

Comparative Example 3

The same procedure as in Example 1 was performed except that the electropolishing conditions were changed to change the surface roughness $R_{max}$ of the inner surface of the cylinder to 12 μm. The composition of the inner surface of the cylinder was determined. The F/Fe was 1.2 and the O/Fe was 1.46. The amount of Fe in the $IF_7$ gas after the storage was 11 ppb by mass, which was more than 10 ppb by mass. Although the gas purity was more than 99.9% by volume, the HF concentration was more than 100 ppm by volume.

Comparative Example 4

The same procedure as in Example 1 was performed except that fluorination treatment was performed by filling the container with $IF_7$ gas at 80° C. for 24 hours. The composition of the inner surface of the cylinder was determined. The F/Fe was 4.52 and the O/Fe was 0.57. The amount of Fe in the $IF_7$ gas after the storage was 11 ppb by mass, which was more than 10 ppb by mass. The gas purity was more than 99.9% by volume. The HF concentration was less than 100 ppm by volume.

Comparative Example 5

The same procedure as in Example 1 was performed except that fluorination treatment was performed by filling the container with $F_2$ gas at 80° C. for 24 hours. The amount of Fe in the $IF_7$ gas after the storage was 10 ppb by mass. The gas purity was more than 99.9% by volume. The HF concentration was less than 100 ppm by volume.

Comparative Example 6

The same procedure as in Example 1 was performed except that a cylinder formed of a stainless steel (SUS304) instead of the manganese steel was used, that fluorination treatment was performed by filling the container with $ClF_3$ gas at 80° C. for 24 hours, and that the second fluorine-containing gas was changed to $ClF_3$ gas. The amount of Cr in the $ClF_3$ gas after the storage was more than 150 ppb by mass. The gas purity was more than 99.9% by volume. The HF concentration was less than 100 ppm by volume.

Comparative Example 7

The same procedure as in Example 1 was performed except that a cylinder formed of a stainless steel (SUS304) instead of the manganese steel was used. The amount of Cr in the $IF_7$ gas after the storage was more than 100 ppb by mass. The gas purity was more than 99.9% by volume. The HF concentration was less than 100 ppm by volume.

Comparative Example 8

The same procedure as in Example 1 was performed except that a cylinder formed of a stainless steel (SUS304) instead of the manganese steel was used, and that fluorination treatment was performed by filling the container with $F_2$ gas at 80° C. for 24 hours. The amount of Cr in the $IF_7$ gas after the storage was more than 100 ppb by mass. The gas purity was more than 99.9% by volume. The HF concentration was less than 100 ppm by volume.

Table 1 and Table 2 below list Examples 1 to 8 and Comparative Examples 1 to 8.

Table 1 shows that in Examples 1 to 8, in which the fluorination treatment was performed at 50° C. or lower, the amount of each of the Fe, Mn, Cr, and Ni in the fluorine-containing gas after the storage was less than 5 ppb by mass, the HF concentration was less than 100 ppm by volume, and the fluorine-containing gas purity was more than 99.9% by volume. Table 2 shows that in all of Examples 1, 5, 6, and 8, the mole ratio F/Fe was 0.01 or more and less than 3 and the mole ratio O/Fe was 1 or less.

In Example 8, the inner surface of the cylinder had a surface roughness $R_{max}$ of 4 μm. In Example 8, impurities due to separation under shock or impurities after long-term storage are presumably more likely to be formed than in Example 1, in which the inner surface of the cylinder had a surface roughness $R_{max}$ of 1 μm or less.

TABLE 1

| | Container | | Fluorination treatment | | | Filling gas | Storage test results | | |
|---|---|---|---|---|---|---|---|---|---|
| | Material | Surface roughness [μm] | First fluorine-containing gas | Treatment temperature [° C.] | Treatment time [Hours] | (second fluorine-containing gas) | Metal content [ppb by mass] | HF concentration [ppm by volume] | Gas purity [% by volume] |
| Example 1 | Mn steel | ≤1 | $F_2$ | 40 | 24 | $IF_7$ | Less than 5 | Less than 100 | More than 99.9 |
| Example 2 | Mn steel | ≤1 | $F_2$ | 40 | 24 | $WF_6$ | Less than 5 | Less than 100 | More than 99.9 |
| Example 3 | Mn steel | ≤1 | $F_2$ | 40 | 24 | $ClF_3$ | Less than 5 | Less than 100 | More than 99.9 |
| Example 4 | Mn steel | ≤1 | $F_2$ | 40 | 24 | $F_2$ | Less than 5 | Less than 100 | More than 99.9 |
| Example 5 | Mn steel | ≤1 | $F_2$ | 20 to 25 | 24 | $IF_7$ | Less than 5 | Less than 100 | More than 99.9 |
| Example 6 | Mn steel | ≤1 | $ClF_3$ | 40 | 24 | $ClF_3$ | Less than 5 | Less than 100 | More than 99.9 |
| Example 7 | Mn steel | ≤1 | $IF_7$ | 40 | 24 | $IF_7$ | Less than 5 | Less than 100 | More than 99.9 |
| Example 8 | Mn steel | 4 | $F_2$ | 40 | 24 | $IF_7$ | Less than 5 | Less than 100 | More than 99.9 |
| Comparative Example 1 | Mn steel | 12 | — | — | — | $IF_7$ | 20 (Fe) | More than 100 | Less than 99.9 |
| Comparative Example 2 | Mn steel | ≤1 | — | — | — | $IF_7$ | 18 (Fe) | More than 100 | Less than 99.9 |
| Comparative Example 3 | Mn steel | 12 | $F_2$ | 40 | 24 | $IF_7$ | 11 (Fe) | More than 100 | More than 99.9 |
| Comparative Example 4 | Mn steel | ≤1 | $IF_7$ | 80 | 24 | $IF_7$ | 11 (Fe) | Less than 100 | More than 99.9 |
| Comparative Example 5 | Mn steel | ≤1 | $F_2$ | 80 | 24 | $IF_7$ | 10 (Fe) | Less than 100 | More than 99.9 |
| Comparative Example 6 | Stainless steel | ≤1 | $ClF_3$ | 80 | 24 | $ClF_3$ | >150 (Cr) | Less than 100 | More than 99.9 |
| Comparative Example 7 | Stainless steel | ≤1 | $F_2$ | 40 | 24 | $IF_7$ | >100 (Cr) | Less than 100 | More than 99.9 |
| Comparative Example 8 | Stainless steel | ≤1 | $F_2$ | 80 | 24 | $IF_7$ | >100 (Cr) | Less than 100 | More than 99.9 |

TABLE 2

| | Container | | Fluorination treatment | | | Treated metal surface | | Filling gas | Storage test results | |
|---|---|---|---|---|---|---|---|---|---|---|
| | Material | Surface roughness [μm] | First fluorine-containing gas | Treatment temperature [° C.] | Treatment time [Hours] | F/Fe | O/Fe | (second fluorine-containing gas) | Metal content [ppb by mass] | Gas purity [% by volume] |
| Example 1 | Mn steel | ≤1 | $F_2$ | 40 | 24 | 1.94 | 0.65 | $IF_7$ | Less than 5 | More than 99.9 |
| Example 5 | Mn steel | ≤1 | $F_2$ | 20 to 25 | 24 | 0.82 | 0.33 | $IF_7$ | Less than 5 | More than 99.9 |
| Example 6 | Mn steel | ≤1 | $ClF_3$ | 40 | 24 | 1.56 | 0.48 | $ClF_3$ | Less than 5 | More than 99.9 |
| Example 8 | Mn steel | 4 | $F_2$ | 40 | 24 | 1.15 | 0.62 | $IF_7$ | Less than 5 | More than 99.9 |
| Comparative Example 1 | Mn steel | 12 | — | — | — | 0 | 2.25 | $IF_7$ | 20 (Fe) | Less than 99.9 |
| Comparative Example 3 | Mn steel | 12 | $F_2$ | 40 | 24 | 1.2 | 1.46 | $IF_7$ | 11 (Fe) | More than 99.9 |
| Comparative Example 4 | Mn steel | ≤1 | $IF_7$ | 80 | 24 | 4.52 | 0.57 | $IF_7$ | 11 (Fe) | More than 99.9 |

In Comparative Example 1, the inner surface of the cylinder had a high surface roughness and no fluorination treatment was performed. In Comparative Example 1, the purity of the $IF_7$ gas was reduced presumably because air components adsorbed on the inner surface of the cylinder were released and reacted with the $IF_7$ gas.

In Comparative Example 1, since no fluorination treatment was performed, the surface of the manganese steel was not terminated with F. Presumably, the manganese steel thus reacted with the $IF_7$ gas, and iron fluoride and iron oxyfluoride derived from the manganese steel entered the $IF_7$ gas, causing the amount of Fe to be more than 10 ppb by mass.

In Comparative Example 1, furthermore, the part of the surface of the manganese steel terminated with H or OH presumably reacted with the $IF_7$ gas to form HF, causing the HF concentration to be more than 100 ppm by volume.

In Comparative Example 2, although the inner surface of the cylinder had a low surface roughness, no fluorination treatment was performed. Presumably for this reason, the $IF_7$ gas purity was low, the HF concentration was more than 100 ppm by volume, and the amount of Fe was more than 10 ppb by mass as in Comparative Example 1.

In Comparative Example 3, although fluorination treatment was performed, the inner surface of the cylinder had a high surface roughness. Presumably for this reason, while the purity of the $IF_7$ gas was not decreased, the amount of metallic impurities was large and the HF concentration was high.

In Comparative Examples 4 and 5, excessive fluorination treatment was performed at 80° C. Presumably, a fluoride film was thus formed on the inner surface of the cylinder, and thereby the amount of Fe was more than 10 ppb by mass due to the iron fluoride of the fluoride film.

In Comparative Examples 6 to 8, the inner surface of the cylinder was formed of a stainless steel. Presumably for this reason, the amount of Cr contained in the metallic impurities was very large.

The invention claimed is:

1. A method for producing a filled container, comprising:
providing a metal storage container, at least an inner surface of which is formed of a manganese steel and in which the inner surface has a surface roughness $R_{max}$ of 10 µm or less;
performing fluorination by bringing the inner surface of the storage container into contact with a gas containing at least one first fluorine-containing gas selected from the group consisting of $ClF_3$, $IF_7$, $BrF_5$, $F_2$, and $WF_6$ at 50° C. or lower;
purging the inside of the storage container with an inert gas; and
filling the inside of the storage container with at least one second fluorine-containing gas selected from the group consisting of $ClF_3$, $IF_7$, $BrF_5$, $F_2$, and $WF_6$.

2. The method for producing a filled container according to claim 1,
wherein the first fluorine-containing gas is $F_2$ gas.

3. The method for producing a filled container according to claim 1,
wherein the second fluorine-containing gas is $ClF_3$ gas or $IF_7$ gas.

4. The method for producing a filled container according to claim 1,
wherein the surface roughness $R_{max}$ of the inner surface of the storage container is 1 µm or less.

5. The method for producing a filled container according to claim 1,
wherein the manganese steel contains 97% by mass or more iron.

6. The method for producing a filled container according to claim 1,
wherein the first fluorine-containing gas is $F_2$ gas, and the second fluorine-containing gas is $ClF_3$ gas or $IF_7$ gas.

7. The method for producing a filled container according to claim 1,
wherein the first fluorine-containing gas is $F_2$ gas, and the second fluorine-containing gas is $WF_6$ gas.

8. The method for producing a filled container according to claim 1,
wherein the first fluorine-containing gas is $ClF_3$ gas, and the second fluorine-containing gas is $ClF_3$ gas.

9. A filled container comprising:
a metal storage container; and
at least one fluorine-containing gas selected from the group consisting of $ClF_3$, $IF_7$, $BrF_5$, $F_2$, and $WF_6$, filling the storage container,
wherein at least an inner surface of the storage container is formed of a manganese steel,
the inner surface has a surface roughness $R_{max}$ of 10 µm or less, and
a surface that contacts the fluorine-containing gas inside the storage container has a mole ratio F/Fe of a fluorine atom F to an iron atom Fe of 0.01 or more and less than 3 and a mole ratio O/Fe of an oxygen atom O to the iron atom Fe of 1 or less, each on average within 10 nm from an outermost surface.

10. The filled container according to claim 9,
wherein the amount of a metal element contained in a metallic impurity in the fluorine-containing gas taken out from the filled container is less than 10 ppb by mass.

11. The filled container according to claim 9,
wherein the mole ratio F/Fe is 0.1 or more and 2.5 or less.

12. The filled container according to claim 6,
wherein the fluorine-containing gas is $ClF_3$ gas or $IF_7$ gas.

13. The filled container according to claim 9,
wherein the surface roughness $R_{max}$ of the inner surface of the storage container is 1 µm or less.

14. The filled container according to claim 9,
wherein the manganese steel contains 97% by mass or more iron.

15. The filled container according to claim 9,
wherein the fluorine-containing gas is $WF_6$ gas.

* * * * *